United States Patent [19]

Florer et al.

[11] 4,095,902

[45] Jun. 20, 1978

[54] AUTOMOBILE WHEEL ALIGNMENT DEVICE AND METHOD

[75] Inventors: Richard H. Florer, Blue Grass; Peter A. Puetz, Davenport, both of Iowa

[73] Assignee: Applied Power Inc., Milwaukee, Wis.

[21] Appl. No.: 662,966

[22] Filed: Mar. 1, 1976

[51] Int. Cl.² .......................................... G01B 11/275
[52] U.S. Cl. ................................................... 356/155
[58] Field of Search .............................. 356/153, 155

[56] References Cited

U.S. PATENT DOCUMENTS

| | | | |
|---|---|---|---|
| 2,292,968 | 8/1942 | Peters | 356/155 |
| 2,601,262 | 6/1952 | Carrigan | 356/155 |
| 3,865,492 | 2/1975 | Butler | 356/153 |

FOREIGN PATENT DOCUMENTS

| | | | |
|---|---|---|---|
| 350,114 | 12/1960 | Switzerland | 356/155 |

*Primary Examiner*—John K. Corbin
*Assistant Examiner*—R. A. Rosenberger

[57] ABSTRACT

An apparatus and method for measuring toe in vehicle wheels. The apparatus ordinarily includes a pair of head units. Each of the head units is mounted upon one of the front wheels of the vehicle. Each head unit includes a projecting element for projecting a light beam generally laterally across the front of the vehicle and onto a target on the opposite head unit in determining front toe of the respective front wheels. Each head unit can also project a beam generally axially from the front wheel of the vehicle to a reflector on the adjacent rear wheel for determination of rear toe of the respective rear wheels. A metering device is connected operatively to signal generators on the head units for determining the toe in each front wheel in relation to a thrust-line reference calculated from the total rear toe of the vehicle.

38 Claims, 18 Drawing Figures

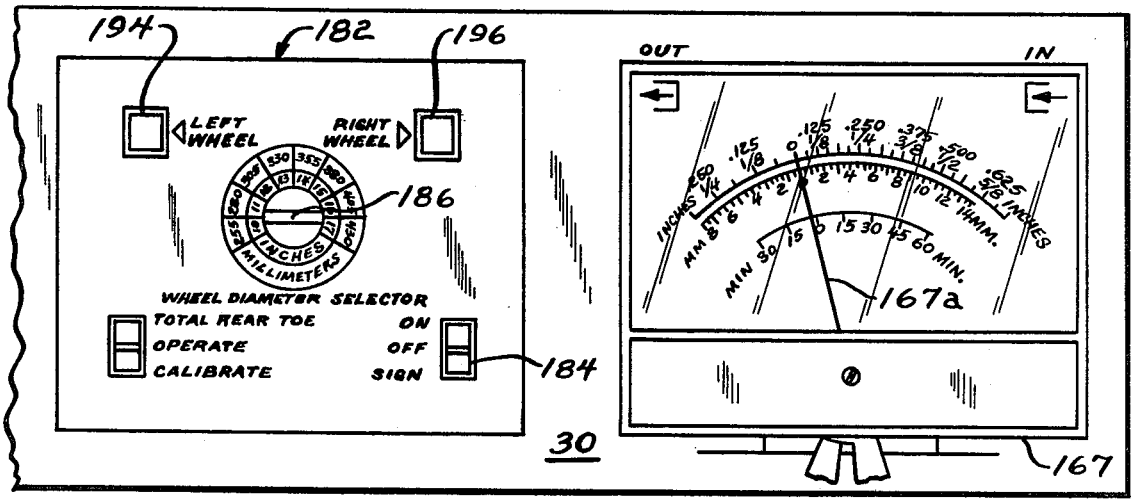
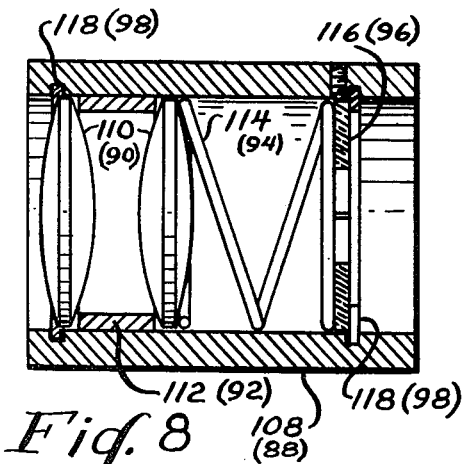
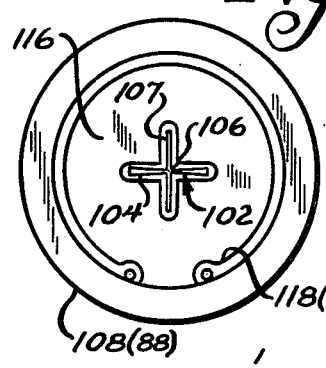
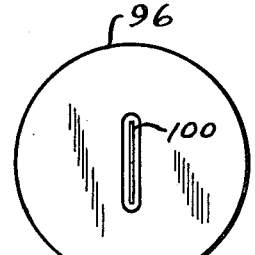
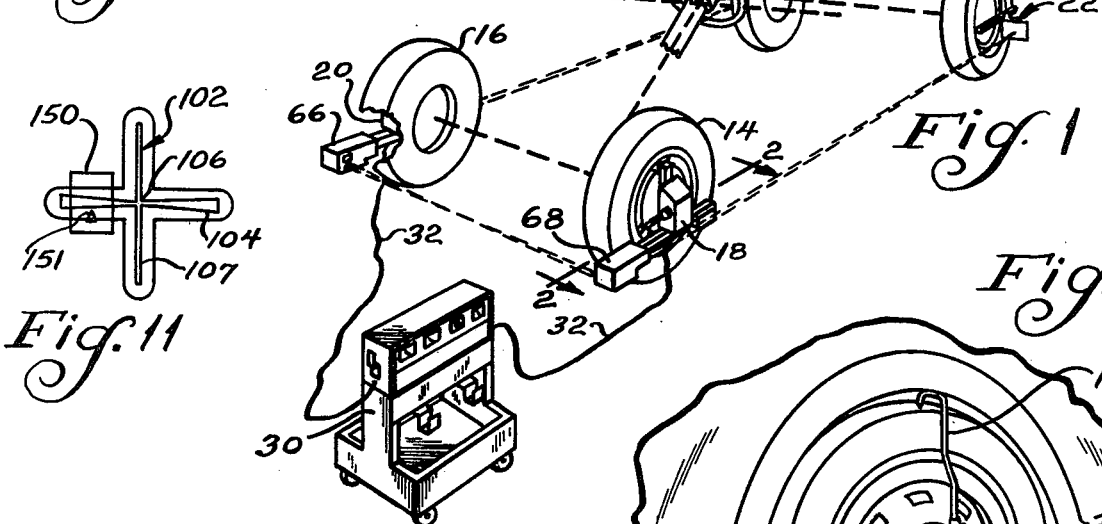
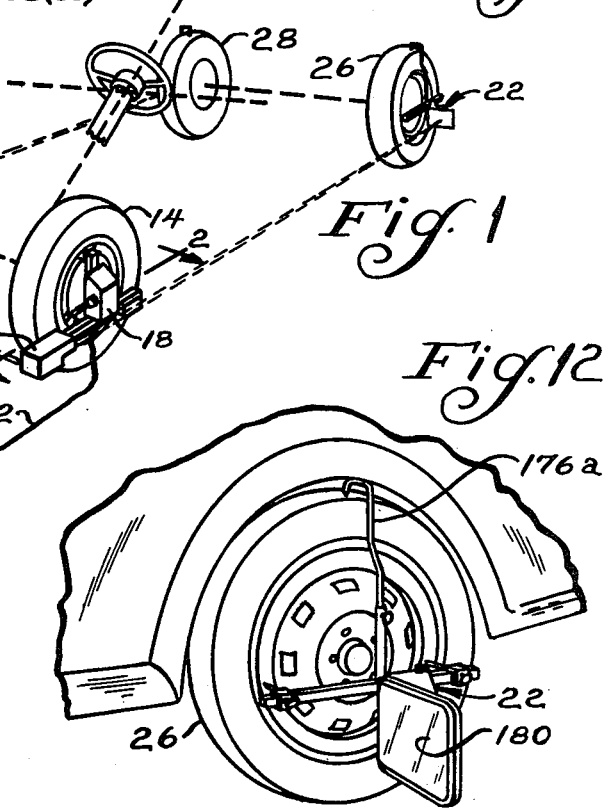

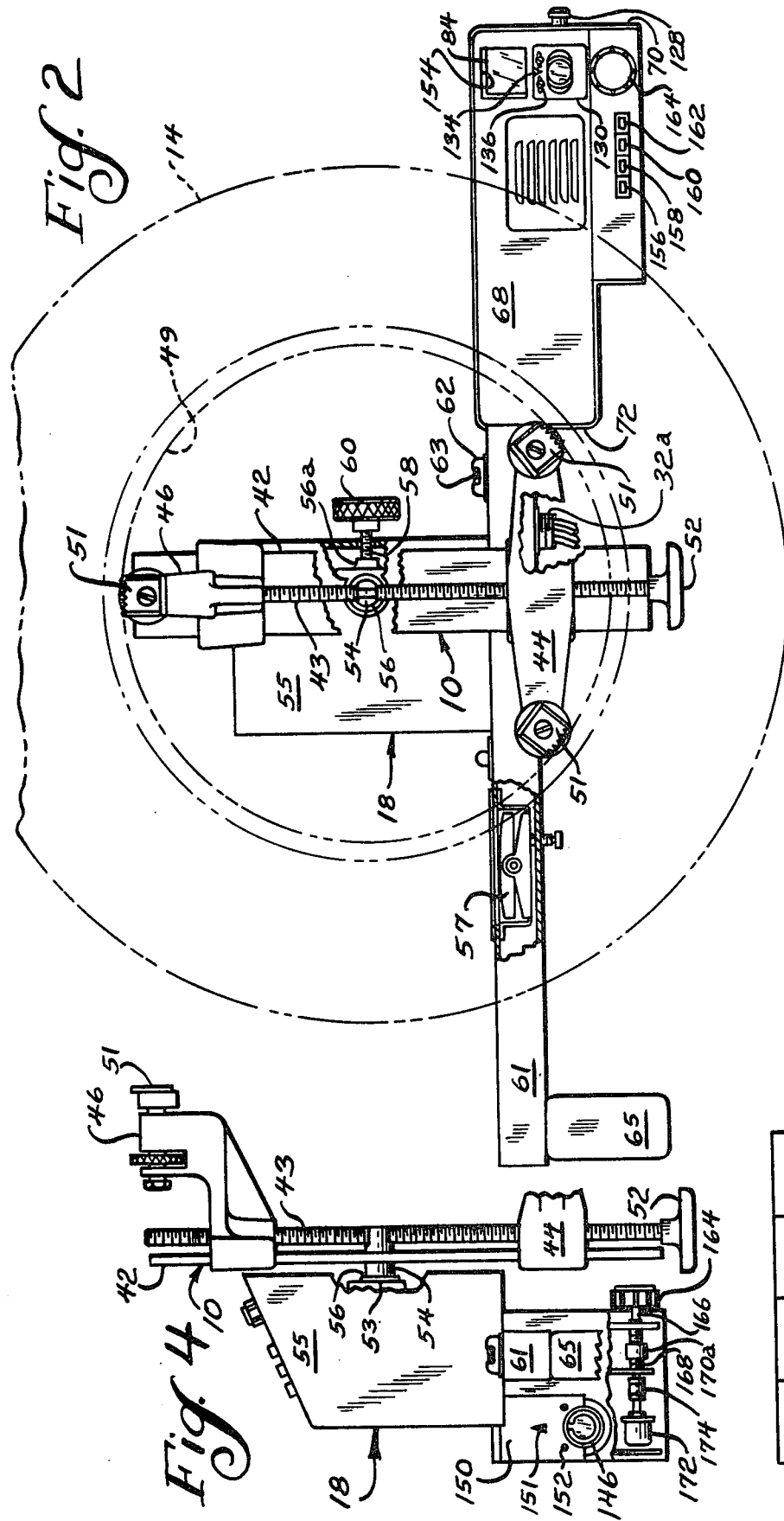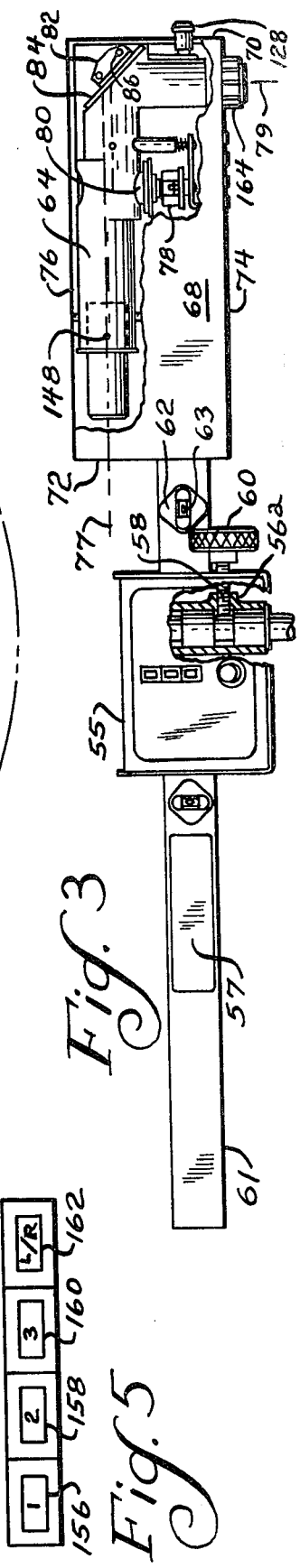

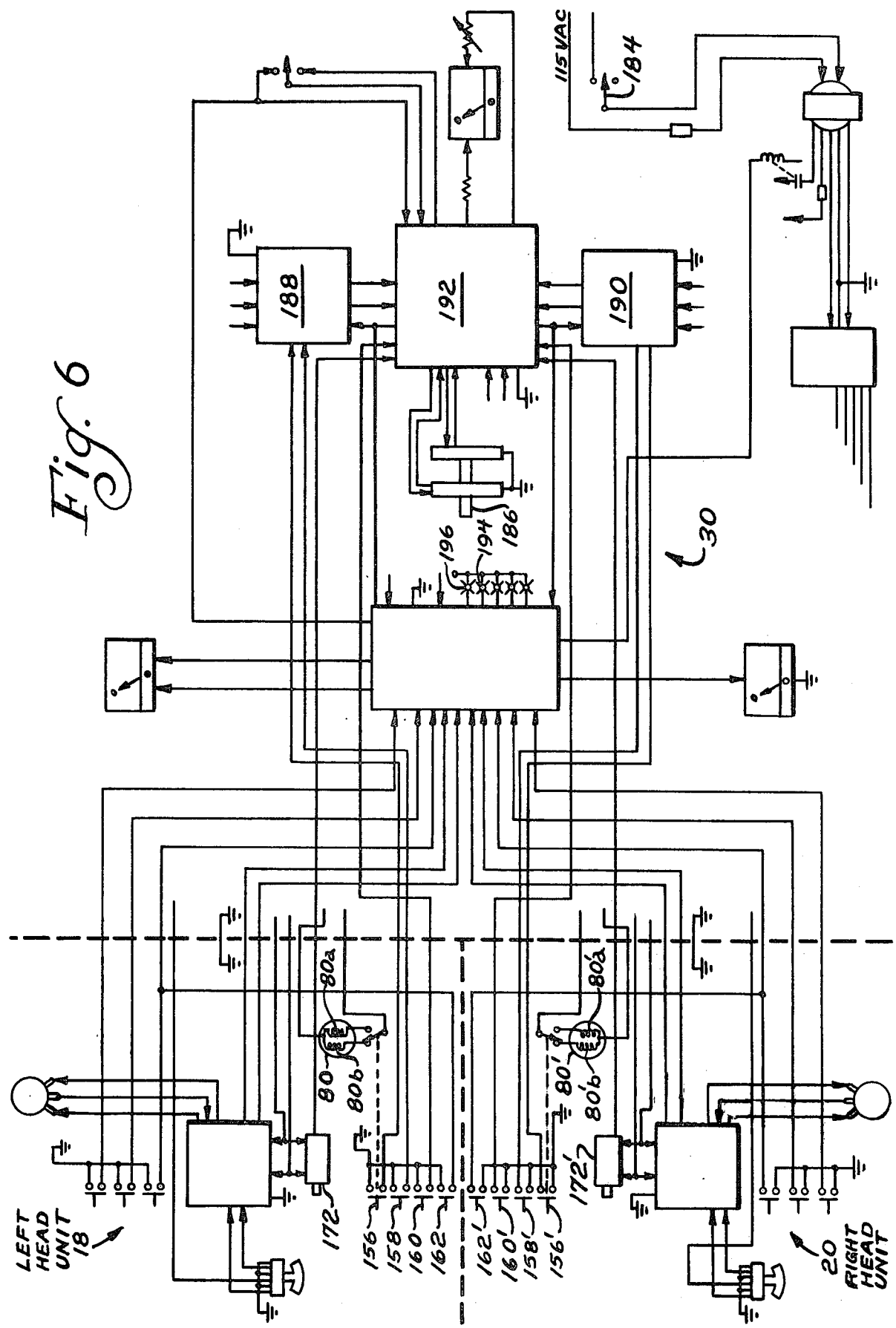

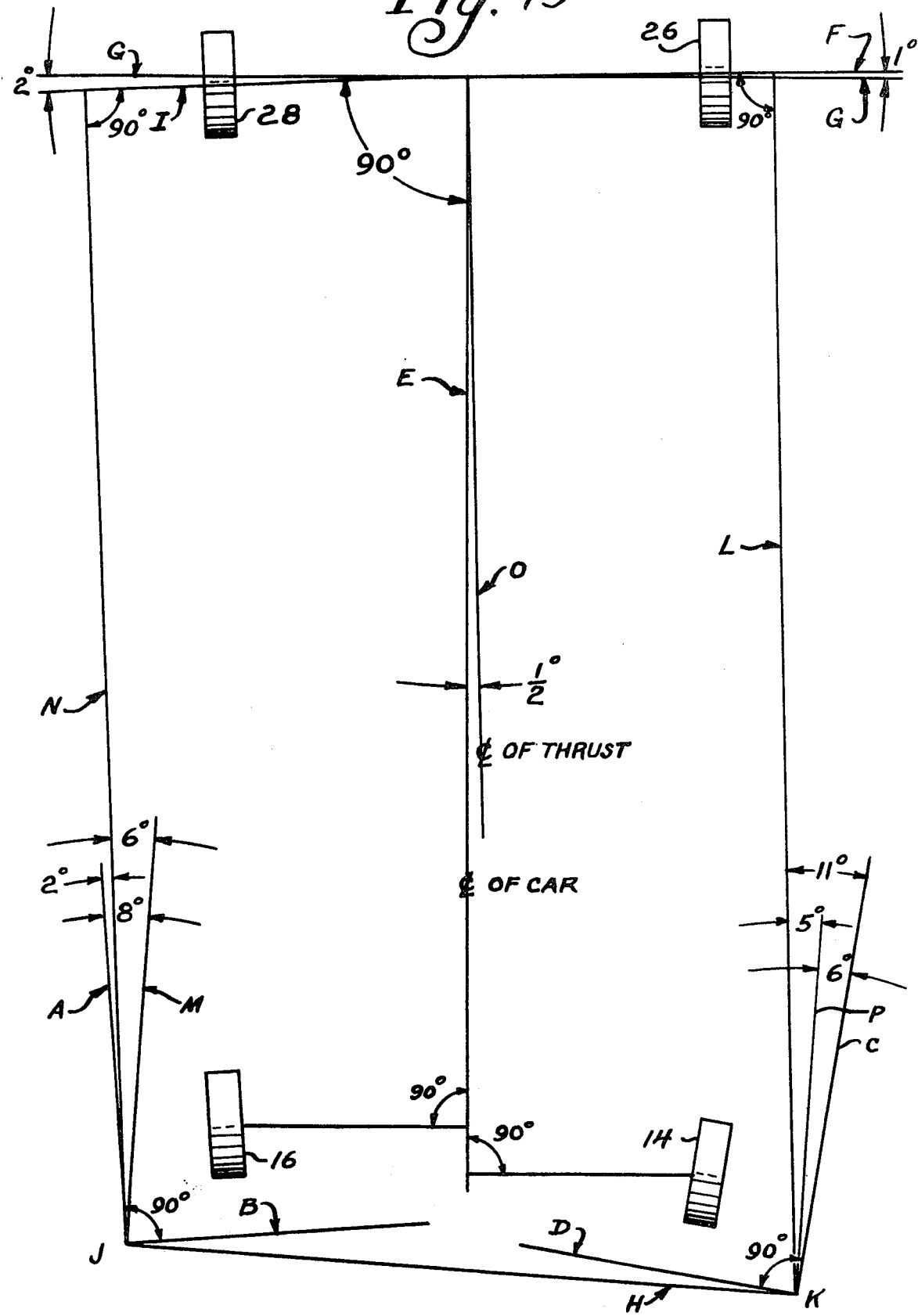

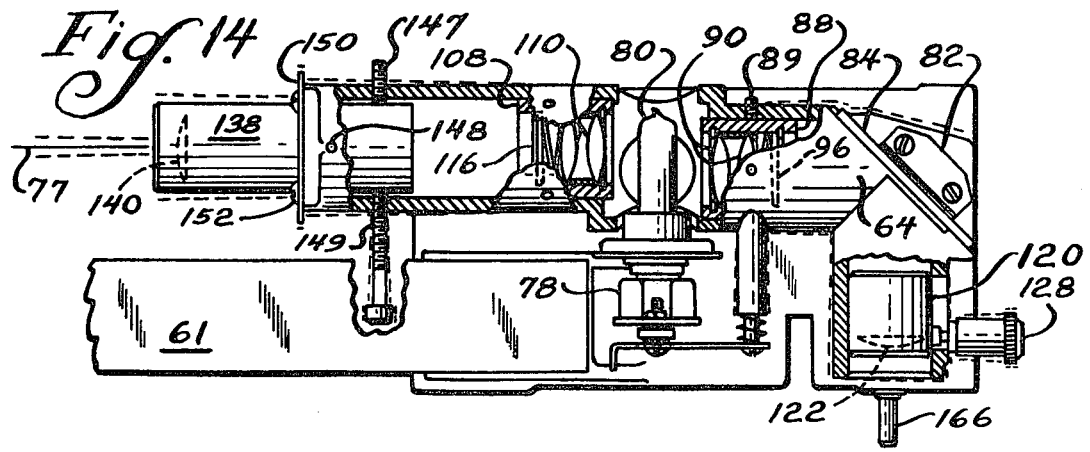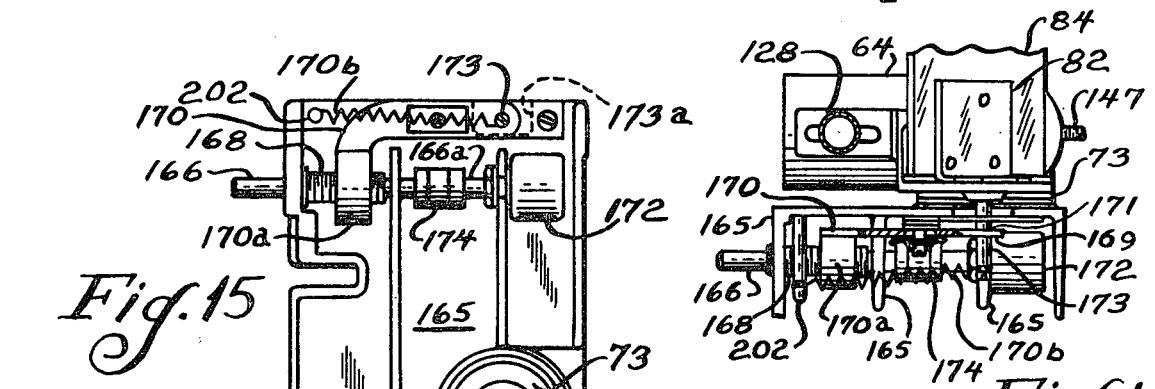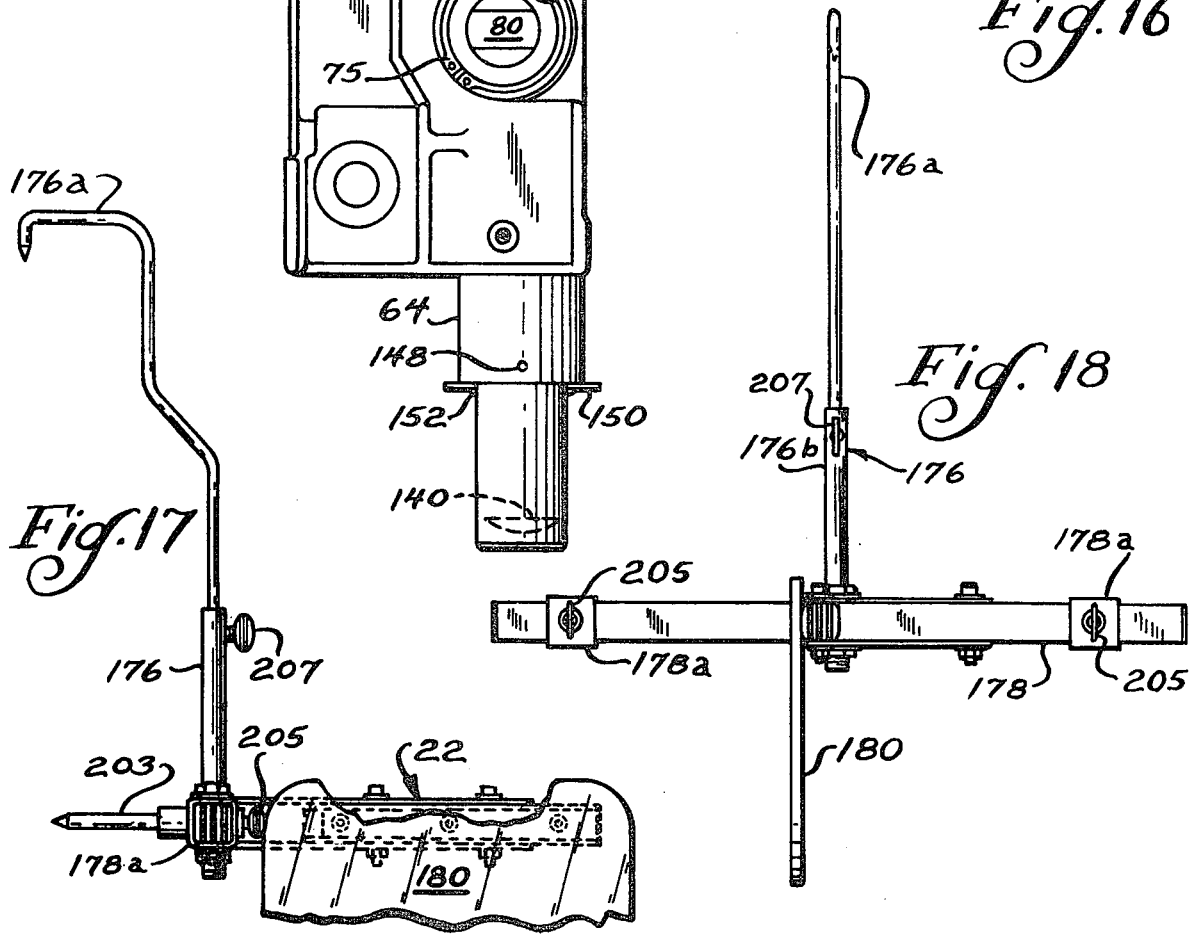

AUTOMOBILE WHEEL ALIGNMENT DEVICE AND METHOD

BACKGROUND OF THE INVENTION

This invention relates generally to improvements in apparatus and methods for aligning wheels on automotive vehicles; and, more particularly, it relates to apparatus and methods utilized in measuring and adjusting certain angular wheel relationships in front wheel alignment, especially toe-in and toe-out angles. Correct wheel toe in automotive vehicles has been found to be very important in prolonging tire life as well as vehicle steerability and controlability.

Toe is typically defined as the difference in distance between the front and the rear portions of the front wheel of a vehicle or angular displacement of the plane of a wheel (perpendicular to its turning axis) relative to a predetermined longitudinal vehicle axis. When the forwardmost portions of a pair of adjacent wheels are closer together than the rear portions of the wheels, they are commonly referred to as in a "toe-in" condition. When the rear portions of wheels are closer together than the front portions, the condition is commonly referred to as "toe-out". Most automotive vehicles are designed so that the front wheel toe angles can be adjusted by lengthening or shortening the tie rods of the vehicle's front wheel suspension.

Various devices and apparatus for measuring toe angles of wheels on automotive vehicles are commercially available. Prior art devices have included various apparatus for measuring the angle of deviation between a reference device extending between the front wheels of a vehicle and a reference plane formed by the front wheels. Some devices have included apparatus for projecting beams of light from devices affixed to front vehicle wheels to off-vehicle targets.

For example, prior art devices are generally used to align front vehicle wheels substantially without reference to or concern for the orientation of the rear wheels of the vehicle, and they generally fail to provide a centered steering wheel. This alignment technique has resulted from the erroneous assumption that the rear wheels of the vehicle were in substantially perfect alignment and that none of the following conditions existed: (1) toe in the rear wheels; (2) rear axle sideset; and (3) inter-axle misalignment, such as swung rear end, swayed vehicle frame, and diamond vehicle frame. Further, in the prior art no consideration was given to possible occurrence of front wheel intra-axle misalignment referred to as "knee-back" or "set back". All of these prior art and commercial devices have operational shortcomings, and these erroneous assumptions are substantial reasons therefore.

In actual practice and field experience with commercial embodiments of the prior art, it has typically been found that one or more of the above-mentioned disregarded conditions frequently exist in automotive vehicles and almost always in damaged ones. Thus, it can be seen that the prior art alignment techniques and apparatus had common shortcomings, primary among these were front toe alignment without reference to rear wheel orientation and intra-axle misalignment of front wheels. These shortcomings, as will be described below, prevent correct and accurate toe alignment in vehicles in a manner insuring the best tire life, vehicle controllability and safety.

The apparatus and technique of the invention have been designed to provide an alignment measuring system for vehicle wheel toe which utilizes both front and rear wheel orientation to facilitate toe adjustment for great tire life and driver safety and to provide an essentially centered steering wheel.

The present alignment device measures and facilitates adjustment of the front toe in each of the front wheels by determining the angular displacement of the front wheels with respect to a calculated thrust-line reference. This reference is calculated algebraically by determining the amount of toe displacement in each of the rear wheels and dividing this total by two. Thus, the front wheels can be aligned with the calculated rear wheel thrust-line to provide a centered steering wheel and essentially perfect tracking of the front wheels to the rear wheel thrust-line.

The present alignment device includes electronic circuitry which is mounted on replaceable printed circuit boards for electronically calculating the amount of toe in each wheel and visually displaying the amount of toe in each of the front wheels in relation to the calculated thrust-line reference. The electronic circuitry provides relatively economical means for automatically calculating toe angles and utilizing a minimum amount of power while providing a high degree of reliability in use.

The system, as a whole, has been designed for relatively easy assembly and can be maintained in operation without frequent repairs. Thus, overall labor and time is saved.

Further, the apparatus of the invention enables an operator practicing the method of the invention, after he has secured the apparatus to a vehicle, to position himself between elevated front vehicle wheels and conduct both the measuring and adjusting functions without leaving this position. The front and rear toe measurements can be readily viewed on the apparatus (no wall references are required) from this position as can the calculations relative thereto. Finally, the tie rod adjustments can ordinarily be made from this position.

SUMMARY OF THE INVENTION

Among the objects of this invention are the provision of an apparatus and technique capable of measuring toe angle or displacement of the front wheels of a vehicle having front and back wheel misalignment problems and yet can overcome the shortcomings of the prior art devices.

The invention provides a new and improved alignment system for measuring toe in each of the front wheels in relation to the total toe orientation of the rear wheels and for providing a centered steering wheel.

The invention provides a method and apparatus for measuring toe angles of vehicles wherein solid state electronic circuitry arranged on replaceable printed circuit board is utilized for storing preselected toe angle measurements received from a signal generator and for electrically computing the stored information in determining the angular displacement of each of the front wheels in relation to a thrust-line reference determined by the position of the rear wheels on the vehicle.

It is an object of the invention to provide an apparatus for measuring toe angles of a vehicle wherein a turret assembly utilizes a generally laterally projecting light beam for alignment with a first reference target to determine the amount of toe in each front wheel and an axially projecting light beam for alignment with a second reference target to determine the position of each rear wheel.

The invention utilizes an apparatus for measuring toe angles of a vehicle wherein a turret assembly includes a reticle to produce a projected image of preselected configuration to visually indicate to an operator the direction the turret assembly must be rotated to align the projected image with a reference target.

The present invention provides an apparatus and method for measuring the relative toe angles of the front wheels of a vehicle and includes a meter device responsive to a signal generated by rotation of the apparatus to indicate the amount of toe existing in each of the front wheels in relation to the position of the rear wheels.

It is an object of the invention to provide an apparatus and method for measuring toe angles of the front wheels of a vehicle in a manner which will enable an operator to achieve fast, accurate and essentially total toe alignment and to provide a centered steering wheel thereby facilitating improved tire life and steering ease.

Another object of the invention is the provision of an apparatus for measuring toe angles of the front wheels of a vehicle which can be relatively economically manufactured and which is both easy to assemble and operate.

In accordance with these aims and objectives, the present invention is concerned with the provision of an apparatus for measuring essentially all of the wheel position of a vehicle. The apparatus of the invention includes a pair of head units which are designed to be mounted detachably on a wheel clamp and secured to each of the front wheels of a vehicle. Each of these head units has a light projector for projecting a light beam generally laterally across the front of a vehicle for use in measuring front wheel toe. Each head unit is also capable of projecting a second light beam down the side of the vehicle to the axially adjacent rear wheel by the same or an independent light projector. The second light beam facilitates determination of the position of each rear wheel. A meter and computer are operatively connected to the signal generators on each of the head units and provide a means for storing, computing, reproducing and displaying information from the signal generators to provide an indication of the amount of toe in each front wheel in relation to a vehicle thrust-line reference calculated from the toe measurement of both rear wheels. The signal generators act to transmit signals to the meter and computer which are proportionally related to the angular displacement of the axes of the light beams.

Among the advantages which can be realized in the use of the instant invention are its capability of providing accurate compensation for front wheel axle misalignment (knee-back), rear axle side-set, and inter-axle misalignment. The toe alignment of each of a vehicle's front wheels can be achieved relative to a calculated thrust-line determined from rear wheel position thereby orienting the front and rear wheels for proper tracking; and all of this can generally be accomplished by an operator working in one general position between the elevated front wheels of a vehicle.

BRIEF DESCRIPTION OF THE DRAWINGS

These and other objects and advantages of the present invention will become more apparent from the following detailed description when read in conjunction with the accompanying drawings wherein:

FIG. 1 is a perspective view of an alignment device constructed in accordance with a preferred embodiment of the invention and shown mounted on the front and rear wheel suspension elements of a partially illustrated vehicle;

FIG. 2 is an enlarged side elevational view of the left head unit mounted on the left front vehicle wheel, looking along the lines 2—2 of FIG. 1;

FIG. 3 is a top plan view of FIG. 2 with parts broken away and showing the left head unit mounted on the left front vehicle wheel;

FIG. 4 is a rear elevation, with parts broken away, of the left head unit of FIG. 2;

FIG. 5 is an enlarged plan view of the switches on the left head unit of FIG. 2;

FIG. 6 is an electrical schematic diagram of the electronic circuitry of the alignment device shown in FIG. 1;

FIG. 7 illustrates a meter module for housing electrical apparatus and visibly displaying measurements;

FIG. 8 is an enlarged sectional view of a condenser lens and reticle sub-assembly which comprises one element of the turret assembly of the present invention shown in FIG. 3;

FIG. 9 is a rear view of a reticle utilized in the tracking condenser lens and reticle assembly as shown in FIG. 8;

FIG. 10 is a front view of a reticle utilized in the toe condenser lens and reticle assembly shown in FIG. 8;

FIG. 11 illustrates a tracking reticle superimposed upon the tracking screen as observed during an alignment operation;

FIG. 12 is a fragmentary perspective view of a tracking mirror assembly of the invention;

FIG. 13 is a diagramatical view showing the arrangements of the elements of the alignment device for measuring toe and tracking of a vehicle;

FIG. 14 is an enlarged fragmentary plan view of the turret assembly of FIG. 3;

FIG. 15 is a bottom plan view of the assembly illustrated in FIG. 14;

FIG. 16 is a partial front view of the assembly illustrated in FIG. 15;

FIG. 17 is a partial fragmentary front view of the mirror assembly illustrated in FIG. 12; and FIG. 18 is a side elevation of the rear wheel mirror assembly.

DETAILED DESCRIPTION OF THE PREFERRED EMBODIMENT

Referring now in detail to the drawings, FIG. 1 shows a schematic perspective of a wheel alignment device of the present invention for measuring essentially all of the wheel positions which are known to occur in automotive vehicles. The preferred embodiment of the alignment device of the invention basically comprises: a pair of wheel clamps 10 attached to the rim of the left front and right front vehicle wheels 14, 16, respectively; a pair of head units 18, 20 secured to the respective wheel clamps 10; a pair of tracking mirror assemblies 22 positioned on the left and right rear vehicle wheels 26, 28 respectively; and a meter module 30 (FIGS. 1, 6 and 7) connected electrically to the head units 18, 20.

Initially, a vehicle shown schematically in FIG. 1 is driven upon a conventional service rack (not shown) having runways for supporting the vehicle wheels and means for raising the rack and vehicle above the floor.

The left wheels 14 and 26 are supported by one of the rack runways, and the right wheels 16 and 28 are supported by the other rack runway. As used herein, left and right is intended to refer to the orientation of the wheels relative to the normal driver position in the vehicle. The front wheels 14, 16 of the vehicle are supported upon conventional rack turning radius plates (not shown). Such plates are pivotally mounted on rack runways to facilitate generally horizontal pivotal movement of the front wheels on the rack. Safety blocks (not shown) are placed behind the rear wheels 26, 28 to maintain the vehicle in the desired position on the rack.

The wheel clamp 10, as is illustrated in FIGS. 2 and 4, is secured to front vehicle wheel 14. The wheel clamp 10 comprises a vertical slide bar 42 having a spindle 54 welded at substantially its intermediate length for detachably mounting the head unit 18, and an elongated double threaded adjustment screw 43 is threaded at one end into the mid-portion of a horizontal bar 44 providing a substantially T-shaped configuration. The other end of adjustment screw 43 is threaded into a clamp arm 46. The horizontal bar 44 and the clamp arm 46 are designed to rigidly grip the wheel rim 49 through jaw members 51. Further, each of the jaw members 51 is adjustably secured to the respective arms to facilitate accommodation of different rim diameters and configurations. The end of the adjustment screw 43 opposite arm 46 is provided with a rotatable knob 52 secured thereto for rotating the double threaded adjustment screw 43 thereby simultaneously driving arm 46 and horizontal bar 44 apart in sliding relation to vertical bar 42. This serves to securely engage the three jaw members 51 with rim 49. Removal is accomplished by rotating screw 43 in the opposite direction. The wheel clamp 10 is of a self-centering type so that when it has been secured to a rim, as described, in operation, the spindle 54 is automatically positioned substantially coaxially with the axle of the wheel as is a head unit 18 or 20 when attached thereto. The wheel clamp 10, as used on wheels 14 and 16, is substantially identical.

While the head units 18 and 20 will be discussed primarily with reference to measuring toe angles, it is understood that the head units of the preferred embodiment accommodate mechanisms, such as camber and caster measuring devices contained within housing 55, and steering axis inclination measuring device 57 (FIGS. 2, 3 and 4), carried by support member 61. These devices are utilized in measuring other angles of wheel alignment, i.e., camber, caster and steering axis inclination.

The left head unit 18 includes a housing 55 provided with a spindle receiving aperture 56. A sleeve 56a is secured to housing 55 adjacent aperture 56, as shown in FIG. 4, for receipt of clamp spindle 54. When head unit 18 is telescoped over spindle 54, it is freely rotatable on the axis of the spindle.

A level vial 62 with an indicator bubble 63 is mounted upon support member 61 adjacent housing 68 of head unit 18 as is shown in FIGS. 3 and 3a. The level vial 62 serves to indicate a horizontal head orientation with respect to the rotational axis of the spindle 54. An adjustable set screw 58 is threaded through sleeve 56a and into adjacent spindle 54. A manually rotatable knob 60 at the end of screw 58 is used to rigidly engage spindle 54 and to lock the head unit in the level position determined by the centering of bubble 63 and vial 62. FIGS. 3 and 4 depict a turret assembly 64 rotatable within housing 68 and containing dual projector and screen elements balanced in the adjusted level position and maintained in position by a counterweight 65. It is to be noted that the opposite turret assembly 66 (FIG. 1) is identical to the assembly 64. However, turret 66 is mounted on the right front wheel 16 of the vehicle in facing relation with the assembly 64. In view of this structural identity primed reference numerals will be used with respect to any reference made to elements in the turret assembly 66 which correspond to the same elements of assembly 64.

The housing 68 containing the turret assembly includes front wall 70, a rear wall 72 and side walls 74 and 76. As is best shown in FIGS. 15 and 16, the turret assembly 64 is rotatable about a vertical axis on a boss 73 journalled in the base 165 of housing 68 and maintained therein by snap ring 75. The turret assembly 64 contains a bulb socket 78 and lamp 80 arranged in a horizontal position and generally normal to optical axis 77. The lamp 80 is preferably of a two filament type in which the filaments can be operated independently of each other. As is shown in FIGS. 3 and 14, a conventional front silvered optically flat mirror 84 is mounted within housing 68 adjacent the corner of front wall 70 and side wall 76. The mounting is maintained at a 45° angle relative to both optical axes 77 and 79 by a retaining bracket 82 anchored to the housing base 165 by screws 86.

The turret assembly 64 (FIGS. 3 and 14) includes a projector element comprising a toe condenser lens and reticle assembly 88 (FIG. 8) which is mounted in fixed position relative to optical axis 77 between the mirror 84 and lamp 80 by screws 89. The toe condenser lens and reticle assembly 88, as can best be seen in FIG. 8, includes co-axially aligned condenser lens 90, lens spacer 92, compression spring 94 and reticle 96 which are held together between snap rings 98. The reticle 96 (FIG. 10) is circular in shape and has a projectable image formed in substantially its center consisting of a vertical hair line 100.

The turret assembly 64 is also provided with another projector element in the form of a tracking condenser lens and reticle assembly 108 which is co-axially located on optical axis 77 (FIGS. 3, 8 and 14). Assembly 108 includes co-axially aligned condenser lens 110, lens spacers 112, compression spring 114 and a reticle 116 which are positioned and held together in place between snap rings 118. The reticle 116 of this assembly differs from reticle 96 as shown in FIG. 9, in that the reticle 116 has a projectable cross-type image 102. The horizontal segments 104 of the cross-image 102 comprise opposed identical isosceles triangles with adjacent vertices forming point 106 defining the center of vertical segment 107 as shown in FIG. 9.

The turret assembly 64 also includes a toe objective lens assembly 120 which is co-axially aligned with optical axis 79 and in which objective lens 122 is positioned and held by a snap ring. The toe objective lens assembly is adjustably mounted within the housing 68 by a retaining screw 128 which is adjustable to permit selective focusing of the objective lens assembly 120. A toe screen 130 (FIG. 2) having an opening 132 and an adjacent reference target 134 is mounted in front of the lens assembly 120 and is secured in position on the housing side wall 74 by fastening screws 136.

Adjacent the rear housing wall 72 and opposite the tracking condenser lens and reticle assembly 108, a tracking objective lens assembly 138 is provided in which a fixed focus objective lens 140 is positioned and retained by a snap ring. The objective lens assembly 138 is mounted in the opening 146 in the rear housing wall 72 and is secured in the housing by set screws 148. As shown in FIG. 4, a tracking screen with a reference target 151 is located above the objective lens assembly 138 and is held in place by set screws 152.

The turret assembly 64 has a tracking screen viewer opening 154 (FIG. 2) positioned in the side wall 74 opposite the mirror 84 and through which reference target 151 on tracking screen 150 can be observed. The projected image of the cross image 102 of reticle 116 is reflected back from the rear wheel tracking mirror assembly 22 onto the tracking screen 150 relative to the reference target 151. Mirror 180 on assembly 22 is adjusted on the wheel to move cross image 102 vertically on screen 150 relative to target 151 until the vertical element of cross 102 will fall within target 151 when laterally adjusted. This system obviates the need for an operator to come out from between the front wheels in order to sight the axially adjacent rear wheel and view an image reflected from the tracking mirror 180.

The lower portion of the side wall 74 of turret housing 68 carries four multi-function push button switches 156, 158, 160, 162 (FIGS. 2 and 5) which control memory and read-out functions in toe angle measurement as illustrated in FIG. 6. Switches 156, 158, and 160 are used to control electrical inputs from the potentiometer 172, memory circuits and computer circuits to the meter module 30. The switch 162 is capable of alternately switching the electrical inputs coming from assembly 64 of head unit 18 on the left front wheel 18 to electrical inputs coming from the assembly 66 of head unit 20 on the right front wheel 16 respectively feeding the inputs into the meter module and memory computer circuits.

As is shown in FIGS. 4, 15 and 16, a turret control knob 164 is secured to one end of a turret control shaft 166 having a threaded portion 168. This knob and shaft combination is journalled in flanges depending in spaced relationship from the base 165 of the housing 68. The threaded portion 168 is threaded into an annular flange 170a secured to one end of arm 170. The opposite end 169 of the arm 170 is provided with an opening 171 to loosely accomodate a vertically disposed pin 173. The end of pin 173 opposite that passing through opening 171 is secured to the lower portion of the turret assembly 64 for generally arcuate movement through an arc within a slot 173a formed in the base of housing 68. A spring 201 is resiliently connected between the bottom of pin 173 and the bottom of a pin 202 fixed to and depending from the base of housing 68 to maintain the loosely fitting pin 173 in constant engagement with the edge of loose fitting opening 171. As the shaft 166 is rotated in one direction or another, arm 170 and annular flange 170a will correspondingly traverse threaded portion 168 of the shaft. As can be seen in FIG. 15, when arm 170 is moved to the right by rotation of shaft 166, pin 173 resiliently retained within the loosely fitting opening 171 is moved to the right in slot 173a through an arc. Movement of pin 173 to the right thereby can produce a rotation of turret 64 and its components through the corresponding rotation of boss 73 relative to the base of the housing. Movement of the arm 170 to the left will reverse this rotation.

A signal generating potentiometer 172, as shown in FIGS. 4, 15 and 16 is mechanically connected to the end of turret control shaft 166 by a flexible coupling 174. The potentiometer 172 is electrically connected to supply voltage, as shown in FIG. 6, so that an output voltage from the potentiometer 172 is generated by rotation of control shaft 166. The voltage output generated by rotation of the potentiometer corresponds proportionally to the degree of rotation of the turret assembly 64. The output voltage produced by rotation of the turret 64 through shaft 166 will be positive or negative depending upon the position of potentiometer's slider contact as caused by the rotation of the knob 164 and thereby the turret 64. Output voltages or values will be fed from the potentiometer 172 to the meter module 30 for storage, respectively, in left and right memory boards 188 and 190 (FIG. 6) which are elements of a computation means. The information stored will correspond proportionally to the relative angular positions of the vehicle's wheels.

As shown in FIGS. 2 and 5, the switches 156 through 162 and the turret control knob 164 are conveniently located on the housing 68 so that all of the toe measuring functions can be accomplished while the operator is positioned in front of the vehicle and between the front wheels 14 and 16 and it is therefore not necessary for him to change positions while measuring toe angles.

Referring to FIGS. 12, 17 and 18, a rear wheel tracking assembly, generally designated 22, is secured to each of the rear wheels 26 and 28. Assembly 22 comprises a horizontal rim guide support 178 carrying a pair of horizontal slides 178a telescoped thereover. A locater pin 203 extending at right angles to support 178 is secured to the back of each slide 178a, and each is selectively movable on support 178 and locked in position by thumb screws 205. A two element vertically adjustable tire hook 176 is secured to the support 178. This tire hook can be adjusted vertically by releasing thumb screw 207 and vertically extending or retracting the telescoped upper element 176a thereof to a desired level with respect to element 176b and then tightening the thumb screw. An optically flat mirror 180 is secured to the support 178 at right angles thereto and parallel to axes of locater pins 203. The assembly is mounted as shown in FIG. 12 with locater pins 203 engaging the tire side wall to place the assembly and mirror 180 at right angles to the vertical plane of the tire. Vertical adjustments of the mirror 180 can be made through adjustment of the tire hook 176 to better position the mirror 180 for image reflection to target 151 (FIG. 4).

FIG. 7 illustrates a front view of a portion of the meter module 30 which includes a toe display meter 167 and control drawer 182. In use, the meter module 30 is suitably connected by a multi-conductor cable 32 to each of the head units 18 and 20 via a connector 32a. The control drawer 182 contains appropriate electronic circuit boards which are depicted schematically in FIG. 6 of the drawings. The control drawer 182 may be mounted in any convenient manner into the meter module 30 to provide easy access to the electronic circuit boards for trouble-shooting and to facilitate easy and fast maintenance and repairs. The circuit boards contain solid state electronic circuitry mounted on replacable printed circuit boards which require relatively low power consumption and exhibit high reliability in operation.

The electronic circuitry of the computation system of the meter module utilizes angle measurements optically obtained from the respective turret assemblies 64 and 66 for determining the toe and tracking angles present in front wheels 14 and 16 of the vehicle. As explained previously, each time the turret assemblies 64 and 66 are rotated by the respective control shafts 166 and 166' an output voltage will be obtained from the potentiometer 172. This output voltage corresponds to the amount of rotation of knobs 164 and 164' which is directly proportional to the amount of rotation of the respective turrets 64 and 66 produced during the optical alignment of the projected retical images 100 and 102 with the respective reference targets 134 and 151. As a result, this output voltage corresponds to the respective amount of toe in each of the front and rear wheels and is stored in the respective memory boards 188 and 190 of the computation system.

Computation board 192 of the system utilizes all of these voltage values stored in the memory boards for calculating resultant voltages to be visually displayed as a read-out on the pointer or indicator 167a of meter 167 corresponding to the amount of toe error in each front wheel in relationship to a calculated reference referred to as a center of "thrust-line" produced by the existing orientation of the rear wheels. While this "thrust-line" in perfectly aligned rear wheels will correspond to the longitudinal axis of the vehicle at its center, misalignment of either or both rear wheels will result in displacement of the "thrust-line" axis.

The "thrust-line" is calculated in the computation board 192 by summing algebraically the voltages stored in the respective memory boards corresponding to the angular deviation or amount of toe in each rear wheel and dividing this sum by two. In this manner, each of the front wheels can be aligned with this thrust-line so that the rear wheels will "track" the front wheels. Tracking is defined as the ability of the rear wheels to follow the front wheels when they are parallel to the center of thrust-line of the rear axle.

The control drawer 182 shown in FIG. 7 has an off-on switch 184 for controlling the supply of power to the meter module 30 and a wheel diameter selector switch 186 for accommodating different wheel sizes. The switch 186 determines the scaling factor of input signals to left memory board 188 and right memory board 190 before feeding the stored values into computation board 192. It should be noted that the other electrical circuitry shown in FIG. 6, but not discussed, is used in conjunction with the measurement of other wheel alignment angles such as caster, camber, etc.

Indicator lights 194 and 196 on the control drawer are provided to give the operator a visual indication of the toe of the front wheel then being measured and displayed on the meter 167. It is to be understood that the meter module 30 can be manufactured in various configurations, for example, two meters 167 could be used with each supplying information with respect to only one front wheel of the vehicle. The meter module can be wall mounted or secured to a movable cabinet having storage capacity for the head units 18 and 20 when not in use.

While the toe measurements have been discussed above with reference to electronic computing circuits for determining the final toe angles to be set into the front wheels, it is understood that this circuitry can be eliminated entirely and the output voltages from the potentiometer 172 can be fed directly to the meter 167. Consequently, each of the output voltages corresponding to the respective amount of toe in each of the front and rear wheels will be displayed sequentially on the meter 167 and must be recorded manually. From these recorded values, it is possible for an operator to mentally carry out the computation steps to determine the center of the thrust-line and the amount of toe in each of the front wheels from this thrust-line. This will be explained fully hereinafter.

OPERATION OF THE PREFERRED EMBODIMENT

In operation, the vehicle is positioned upon a rack with the front wheels on turning radius plates and back wheels fixed in place. The wheel clamp 10 is attached to the left front vehicle wheel 14 and the head unit 18 is, in turn, connected to the clamp spindle 54 as described above. The head unit 18 is rotated on the spindle 54 until the bubble 63 in level vial 62 indicates that support arm 61 and the turret assembly 64 carried thereby are level. Knob 60 is then turned and tightened to lock the head unit 18 in the desired level or horizontal position on the spindle 54. The vehicle steering wheel is centered to indicate a normal straight front wheel condition and is fixed against movement by a conventional steering wheel clamp (not shown). Position adjustment of the wheels will ultimately maintain this steering wheel position. The head unit 18 is rechecked to insure that the predetermined level position has been maintained and is readjusted as required to maintain the level condition. The other head unit 20 is then mounted in substantially the same manner on the right front wheel 16.

Prior to initiation of the alignment procedure, switch 162 (FIGS. 2–5, 6) is depressed to actuate the toe meter 167 of meter module 30. Subsequent to toe meter actuation, switch 160 is activated to operate filament 80b of lamp 80 of the turret assembly 64 and directs a light beam along optical axis 77 to the axially adjacent rear vehicle wheel 26. Tracking mirror assembly 22 is secured to the left rear wheel 26, as shown in FIG. 12, with the mirror 180 disposed at a right angle the vertical plane of the wheel. Mirror 180 on assembly 22 is adjusted plane of the wheel. Mirror 180 can be adjusted vertically as described above. This may be done to permit the cross image 102 projected through the tracking reticle 116 of the tracking condenser lens and reticle assembly 108 to be reflected from the mirror 180 as a visable image on tracking screen 150 as is shown in FIG. 11. This procedure is then repeated with the head unit 20 on the right side of the vehicle.

An operator can now position himself under the vehicle, which has been previously elevated on a support rack, and between the front wheels 14 and 16 and perform the measurements and toe adjustments without changing his position between the wheels. From this position, he can observe toe screen 130' on the right head unit 20. Toe alignment procedure is initiated by activation of switch 156 on turret assembly 64 of the left head unit 18. This selectively activates filament 80a in lamp 80 producing a toe beam projected through toe condenser lens and recticle assembly 88 on optical axis 77 onto mirror 84 of turret 64 and its direction is changed 90° thereby and is reflected through toe objective lens 120 co-axially with optical axis 79. Simultaneously, switch 156 disconnects the filament 80b of lamp 80 which produced the initial tracking beam for adjustment of mirror 180. The toe beam is thereby directed generally laterally across the front of the vehicle wheels.

The turret assembly 64 is controlled through a turret knob 164 and shaft 166 which, when turned, as described above, rotates the turret assembly on boss 73 relative to the housing 68 as is illustrated in FIG. 3. The knob 164 is rotated until a vertical hairline image produced by projecting light from the filament 80a of lamp 80 through reticle 96 and toe objective lens 120 is aligned with the reference target 134' on the toe screen 130' of the opposite, or right head unit 20. As the turret knob 164 is turned the signal generating potentiometer 172 co-axially disposed on shaft 166 also turns. This potentiometer rotation generates a predetermined output voltage or value which is proportional to the angular degree of rotation of knob 164 and thereby turret assembly 64 and its optical axes 77 and 79. This output value is fed to the left memory board 188 through computation board 192 of the computation system, for sealing and buffering [FIG. 6].

At this point, a switch 158 is activated on housing 68 of turret 64 to store the measured voltage corresponding to left front wheel toe angle in left memory board 188. In addition, the multiple action switch 158 simultaneously turns off the toe beam produced by the filament 80a in the lamp 80 and illuminates the other filament 80b to define a rear tracking beam projecting the cross image 102 of reticle 116 back to the mirror 180 on the optical axis 77 which image is then reflected forward to the tracking screen 150.

The combined images of the reference target 151 on screen 150 and the image of cross 102 reflected onto the screen (FIG. 11) can be directly viewed on mirror 84 by an operator through the tracking screen view opening 154 from his position beneath the front wheels. The turret knob 164 is again turned until the projected image of the cross 102 reflected from the mirror 180 is centered on the reference target 151 as viewed on mirror 84 through opening 154.

The direction of rotation of knob 164 can be readily determined by the operator viewing target 151 and the image of cross 102 as shown in FIG. 11. The knob is rotated to produce movement of the horizontal triangular cross arms 104 relative to target 151 towards the vertex 106 of either isosceles triangle. Since only a relatively small segment of arms 104 are ever visible in opening 154, the converging triangle arms provide a ready reference of direction of movement and thereby rotation.

The output voltage generated by the rotation of potentiometer 172 with turret control knob 164 will now be a new voltage value which will correspond to the left rear wheel toe angle. This new voltage value is again fed to the left memory board 188 of the computation system as before. Then, the switch 160 is depressed to store this value which corresponds to the amount of toe angle in the left rear wheel into the memory board 188.

The complete procedure is now repeated with head unit 20 with respect to the right front and rear vehicle wheels. After the switch 160' on turret 66 is depressed, the computation board 192 will automatically utilize the output voltages or values stored in the left and right memory boards for computing new resultant voltages or values corresponding to the amount of toe in each of the front wheels in relation to the new calculated thrust-line of the rear wheels. This resultant voltage or value is then displayed by pointer 167a on the meter 167.

One of the indicator lights 194 and 196 will be illuminated to visually indicate whether the displayed reading on meter 167 applies to the left or right front toe. Activation of switch 162 will switch the indication to the other wheel. The center of thrust-line is calculated by the computation board 192 of the computation system by taking the voltage or value corresponding to the position of the left rear wheel stored in the left memory board 188 and by taking the voltage corresponding to the position of the right rear wheel in the right memory board 190 referenced to each respective first voltage value stored in the left and right memory board and adding them together algebraically. This sum is then divided by two to provide a new zero reference which corresponds to the calculated thrust-line of the rear wheels.

The difference between the output of signal generator and the new calculated zero reference will be displayed on the meter as the amount of the left toe angle. By depressing switch 162' the amount of right toe with respect to this same zero reference will be displayed.

With the meter pointer 167a indicating the right toe angle, the turret knob 164' is turned to eliminate this toe angle by bringing the pointer of meter 167 to the zero position or until the desired toe-in or toe-out angle is displayed by the pointed 167a of meter 167. The tie rods for the right front wheel are then mechanically adjusted until the tracking beam on axis 77 having the cross configuration 102' (FIGS. 9 and 11) is centered relative to the reference target 151' on the tracking screen 150'. This procedure is repeated on the other side of the vehicle.

While the discussion above deals with left and right head units 18 and 20 and left and right tracking mirror assemblies 22, the method of the invention can be practiced in a somewhat less convenient manner. This can be achieved by mounting a single head unit on a front wheel. The head unit can be optically arranged to project left and right toe beam images. In the alternative, a left and right turret assembly 64 and 66, respectively, can be coupled in back-to-back relationship in a single housing 68. A single mirror assembly is mounted on the axially adjacent rear wheel, and a target, otherwise carried by a second head unit, is mounted on the front wheel opposite the head unit. In such a system, the head unit, mirror assembly, and target are used to measure toe on one side of the vehicle as described previously. Upon completion of this measurement, each of the elements is transferred to opposite wheels for measurement on the opposite side of the vehicle.

It should be understood that the head units must be preliminarily calibrated prior to operation in order to establish the perpendicular alignment of the optical axes 77 and 79 of each turret from which all later angles are measured. This is done so that all position measurements will be correctly and accurately referenced to perpendicular axes 77 and 79. Generally, these perpendicular optical axes are pre-set at the factory during turret assembly manufacture. However, in the event that the perpendicular optical axes are out of alignment they may be re-calibrated in the field.

For example, a typical calibration fixture which can be used (not shown) is an elongated bar having spindles attached at right angles thereto at substantially each end of the bar to simulate a vehicle with perfectly aligned front and rear axles. The spindles will have a diameter corresponding to that of spindle 54 of clamp 10. A head unit is mounted on each end of the elongated bar and each turret shaft 166 is turned so that each toe light beam on axis 79 is positioned parallel to the elongated bar. This is accomplished by projecting a reticle image to a fixed reference target located at a given distance from each end of the elongated bar. Then, the meter pointer is adjusted to read zero by rotating the potentiometer relative to the turret shaft 166 by axially adjusting the flexible coupling 174.

With the turret shaft 166 and potentiometer 172 maintained in this position, each head unit is removed from the elongated bar and subsequently mounted on one of the spindles secured to the elongated bar. The tracking beams on axis 77 are checked for parallel alignment with a fixed reference target positioned at a given distance from each end of the elongated bar. If each tracking beam is not parallel to the bar, then its respective tracking objective lens assembly is repositioned until each optical axis is aligned in parallel relationship with the elongated bar.

Referring now to FIG. 13 of the drawings, the various angles utilized in measuring the toe and tracking of the wheels 14, 16, 26 and 28 of a vehicle are diagramed. For purposes of illustration, the left front wheel 14 has been shown with toe-in and the right front wheel 16 with toe-in in reference to Line E, and axle set back (knee back) from the left wheel 14. The left rear wheel 26 is shown to have slight toe-out and the rear right wheel 26 toe-in in reference to Line E. A line "A" corresponding to the right tracking beam on optical axis 77' is parallel to the plane of wheel 16 and a line "B" corresponding to the right toe beam on optical axis 79' is perpendicular to the line "A". A line "C" corresponding to the left tracking beam on optical axis 77 is parallel to the plane of wheel 14 and a line "D" corresponding to the left toe beam on optical axis 79 is perpendicular to the line "C". A line "E" represents the center line of the vehicle and would constitute the thrust-line reference of the vehicle if the wheels and axles were properly aligned. Line "G" is perpendicular to the line "E" defining perfect rear axle and wheel alignment. A line "F" is displaced at an angle of 1° from the line "G" to represent 1° of toe-out in left rear wheel 26. This line also represents the plane of mirror 180 on assembly 22. A line "I" is displaced at an angle of 2° from the line "G" to represent a 2° toe-in of right rear wheel 28. The line also represents the plane of mirror 180' on assembly 22'.

When an alignment procedure is initiated, line "D" representing the left toe beam of head 18 must be aligned with the point "J" which is at a fixed distance from the right front wheel 16. Point "J" represents the reference target 134' on the toe screen 130' on head unit 20. To do this, turret 64 is rotated to turn axis 79, represented by line "D", to the position of line "H" which, in this instance, represents movement through an arc of 6° toward the front of the vehicle.

The sign convention used in describing positive and negative angles is determined by the direction of arcuate movement of a line to achieve wheel alignment. If the direction of movement describing the arc is towards the front of the vehicle in order to achieve alignment the angle is referred to as a negative or minus. If the line is swept through an arc towards the rear of the vehicle, the angle is referred to as positive or plus.

Thus, line "D" moved through an arc of minus 6° to reach the line "H". A first output voltage value generated by rotation of the potentiometer 172 of turret 64 corresponding to this minus 6° angle is stored in the left memory board 188 of the computation system when the switch 158 is depressed. Simultaneously with this movement, the line "C" representing optical axis 77 of turret 64 will be moved to a position "P". The projected tracking beam on axis 77 reflected from the mirror assembly 22 must be then aligned with the reference target 151 on the tracking screen 150. The accomplish this, the line "P" must be turned 5° in a negative direction to the line "L". A second output voltage value generated by rotation of the potentiometer 172 corresponding to this is also stored in the left memory board 188 when the switch 160 is depressed as a readable rear toe value.

Moving to the other side of the vehicle, the line "B" representing the right toe beam must be aligned with the point "K" representing the reference target 134 on the toe screen 130 of head unit 18. In order to effect this result, the line "B" must be moved to line "H" through an angle of minus 8°. A first output voltage value generated by the rotation of potentiometer 172' corresponding to this arc is then stored in the right memory board 190 when the switch 158' is depressed. Corresponding to this movement, the line "A" representing the right tracking beam will have swung through an arc to a position defined by line "M". This projected tracking beam on axis 77' reflected from the mirror assembly 22' must be aligned with the reference target 151' on the tracking screen 150'. Thus, the line "M" must be moved to line "N" through an angle of plus 6°. A second output voltage value generated by the rotation of potentiometer 172' and corresponding to this arc is likewise stored in the right memory board 190 when the switch 160' is depressed as a readable rear toe value.

When the switch 160' is depressed, the computation board of the computation system automatically electronically algebraically sums the second output voltage values referenced to first values stored in each memory board and divides this sum by two. Specifically, the resultant voltage will correspond to an angle of plus $\frac{1}{2}°$ which is obtained as follows: algebraic sum of 5° and $+6°$ divided by 2 equals $+\frac{1}{2}°$. This represents a new center of thrust-line reference based upon the illustrated misalignment of rear wheels 26 and 28 and is designated by a line "O" which is located $\frac{1}{2}°$ from the line "E". This value can be read on meter 167 as total rear toe. Further, the computation board supplies a meter reference value corresponding to the calculated center of thrust-line. The meter then alternately displays the position of the wheels in reference to the calculated center of thrust-line. Thus, the right wheel at $-2°$ will cause a meter indication of $-2\frac{1}{2}°$. Correspondingly, the left wheel at $-11°$ causes a meter indication of $-11\frac{1}{2}°$. Thus, these final readings of $-2\frac{1}{2}°$ and $-11\frac{1}{2}°$ will be displayed alternately by depressing meter switches 162' and 162 to visually illustrate through meter 167 and indicators 196 and 194 (FIG. 7) the amount of toe in the right and left front wheels, respectively.

The operator next adjusts the respective turret knobs 164' and 164 to zero or eliminate this toe reading or in the alternative to set in the amount of toe desired. He will now look into the tracking viewer openings 154' and 154 to see if the corresponding right and left tracking beams are aligned with their respective reference targets. If they are not, the tie rods on the vehicle will be adjusted until the tracking beams are in alignment with the respective reference targets on the tracking screens. The predetermined correct amount of toe has now been obtained in each front wheel.

In view of this explanation, it can be seen that the present alignment system establishes a new center of thrust-line reference for the rear wheels and the toe of each of the front wheels can be subsequently adjusted to a predetermined orientation with this reference thrust-line. Further, the toe alignment device takes into consideration all of the various toe angles in the front and rear wheels, intra-axle misalignment such as set-back and inter-axle misalignment such as swung rear end, swayed frame and diamond frame.

From the foregoing description of the alignment device embodying the present invention, it can be seen that the inventor provides a new and improved alignment device and method for measuring and adjusting toe angles of the front wheels of a vehicle relative to rear wheel orientation requiring a minimum of movement by an operator both in measuring and adjusting. Further, the alignment device provides a fast and accurate total toe alignment facilitating prolonged tire life and vehicle safety.

While preferred embodiment of the present invention has been illustrated and described, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the scope thereof. Therefore, it is intended that this invention not be limited to the particular embodiment disclosed as the best mode contemplated for carrying out this invention, but that the invention will include all embodiments falling within the scope of the appended claims.

We claim:

1. An apparatus for measuring angular relationships of vehicle wheels comprising: a head unit; means for positioning the head unit in a predetermined relationship with a first vehicle wheel; means for selectively projecting a beam relative to the head unit to beam receiving means; the selective projecting means being connectable to a power source; beam receiving means; means for positioning the beam receiving means relative to second, third and fourth vehicle wheels; means for measuring the positional orientation of said third and fourth vehicle wheels in relation to a reference axis for determining a vehicle thrust-line reference; and indicating means for registering angular relationships between beams projected to beam receiving means on said second and third vehicle wheels and the reference axis for indicating the angular disposition of the first and second vehicle wheels with respect to the vehicle thrust-line reference.

2. The apparatus of claim 1 wherein the head unit is adapted to be positioned adjacent one of the front wheels of the vehicle and including a second head unit, means for positioning the second head unit in a predetermined relationship with another of the front wheels of the vehicle, means for selectively projecting a beam relative to the second head unit to a beam receiving means, the beam receiving means being adapted for positioning adjacent each of two rear vehicle wheels for receipt of the projected beam from each of the respective projecting means, and the indicating means comprising metering means.

3. An apparatus for measuring the position of wheels on a vehicle comprising: a head unit; means for detachably and adjustably mounting the head unit on a front wheel; adjustable projecting means connectable to a power source and carried by the head unit for selectively projecting a first beam across the front of a vehicle to measure front wheel toe and for selectively projecting a second beam to the axially adjacent rear wheel to determine rear wheel position; beam receiving means; means for detachably mounting beam receiving means on the front wheel opposite the head unit and the rear wheel axially adjacent the head unit; and computation means coupled to the head unit for determining the amount of toe in a front wheel in relation to a vehicle thrust-line reference calculated from the positions of the rear wheels of the vehicle.

4. The apparatus of claim 3 wherein the means for detachably mounting the head unit on a wheel comprises a wheel clamp for removably securing the head unit to the wheel rim.

5. The apparatus of claim 3 wherein the beam receiving means are adjustable.

6. The apparatus of claim 3 wherein the adjustable projecting means of the head unit includes a reticle of pre-selected configuration to produce a projected image upon a beam receiving means.

7. The apparatus of claim 3 wherein one of the beam receiving means is a target for receipt of an image projected by a beam and the other beam receiving means is a reflector for receipt and reflection of an image projected by a beam to a target displaced therefrom.

8. The apparatus of claim 3 wherein the head unit includes a housing, the adjustable projecting means is disposed within the housing, and means are provided for rotating the projecting means relative to the housing to produce selective beam projection.

9. The apparatus of claim 8 wherein signal generating means connectable to a power source are connected between the rotating means and computation means whereby signal values generated by the rotating means are transmitted to the computation means in proportion to the amount of relative rotation between the housing and the projecting means in the determination of toe angles and wheels position.

10. The apparatus of claim 3 including a second head unit; means for detachably and adjustably mounting the second head unit on the other front wheel; adjustable projecting means carried by the second head and connectable to a power source for selectively projecting a third beam across the front of the vehicle to measure front wheel toe and for selectively projecting a fourth beam to the axially adjacent rear wheel to determine rear wheel position; means co-operatively connecting computation means to the second head unit; meter means connected to the computation means; and wherein the beam receiving means on the front wheels are targets provided on each of the head units and the beam receiving means detachably mounted upon each of the rear vehicle wheels, 11. The apparatus of claim 10 wherein each of the adjustable projecting means carried by the respective first and second head units comprises: a turret and each turret includes a lamp disposed between opposed plural image producing reticles and plural lenses, turret reflecting means for changing the direction of at least one of the selectively projected beams, and viewing means for visual observation of reticle images produced by selectively projected beams relative to the targets on the head units.

12. The apparatus of claim 10 wherein each of the adjustable projecting means carried by the respective first and second head units is carried upon a rotatable turret and the first and second selectively projected beams of the first turret of the first head unit define axes which are maintained in normal relationship in operation and the third and fourth selectively projected beams of the second turret of the second head unit define axes which are maintained in normal relationship in operation.

13. The apparatus of claim 12 wherein the means for adjusting the adjustable projecting means carried by the respective first and second turrets include: a member rotatably connecting the turret to the head unit; a rotatable element on the head unit; and linkage means interconnecting the turret to the rotatable element whereby selective rotation of the rotatable element will produce a corresponding measurable rotation of the turret about the rotatable member and the beams projected by the turret can be selectively directed.

14. The apparatus of claim 13 wherein the computation means includes a plural signal generating means connectable to a power source; one signal generating means being connected between the rotatable turret and the rotatable element of each head unit; and means coupling the signal generating means to the computation means whereby the measurable rotation of the turret produces signal values proportional to the rotation thereof for transmission to the computation means.

15. The apparatus of claim 10 wherein the computation means include: signal generators coupled to each of the head units for detecting adjustment of the adjustable projecting means thereof; storage means coupled to the signal generators for storing values transmitted therefrom and calculating means coupled to the storage means for receipt of stored values therefrom.

16. The apparatus of claim 10 wherein each head unit includes adjustable and independently operable first and second projecting means for selectively projecting light beams to the targets of opposite front wheels and to the reflectors of axially adjacent rear wheels which reflect the beams received thereon to targets on the respective head units to permit independent measurement of front wheel and rear wheel toe.

17. The apparatus of claim 10 including a signal generating means connectable to a power source and connected between the adjustable projecting means of each head unit and wherein the computation means includes calculating means coupled to the meter means whereby signals generated by the projecting means are transmitted to the calculating means in proportion to the amount of adjustment of the respective projecting means to enable the calculating means to determine the rear wheel position of the vehicle and to compute a calculated thrust-line reference relative to the rear wheel position for front wheel toe measurement and adjustment relative thereto.

18. An apparatus for measuring the toe relationship of wheels on a vehicle with respect to a calculated thrust-line reference comprising: a head unit; means for detachably and adjustably mounting the head unit on a front wheel; adjustable projecting means connectable to a power source and carried by the head unit for selectively projecting a first beam across the front of a vehicle to measure front wheel toe and for selectively projecting a second beam to the axially adjacent rear wheel to determine rear wheel position; beam receiving means; means for detachably mounting beam receiving means on the front wheel opposite the head unit and the rear wheel axially adjacent the head unit; and meter means coupled to computation means on the head unit for calculating a vehicle thrust-line reference determined from the positions of the rear wheels of the vehicle and visually indicating the amount of toe in a front wheel in relation to the vehicle thrust-line reference.

19. The apparatus of claim 18 wherein the head unit includes a housing, the adjustable projecting means is disposed within the housing, and means are provided for rotating the projecting means relative to the housing to produce selective beam projection.

20. The apparatus of claim 19 wherein signal generating means connectable to a power source are connected between the rotating means and meter means whereby signal values generated by the rotating means are transmitted to the meter means in proportion to the amount of relative rotation between the housing and the projecting means in the determination of toe angles.

21. A head unit for measuring vehicle wheel toe comprising: a base member; means for removably mounting the base member upon a vehicle wheel; means for orienting the base member along a predetermined axis relative to the wheel upon which it is mounted; means for maintaining the orientation of the base member on a predetermined axis; a light source carried by the base member; means connected to the light source for selective energization thereof and for coupling to a power source; light projecting means carried by the base member and disposed relative to the light source for transmission of a light beam on a predetermined optical axis; means for rotating the light projecting means relative to the base on an axis substantially normal to the optical axis; and wherein signal generating means connectable to a power source are carried by the base for generating signal values proportional to the rotation of the light projecting means relative to the base and means are provided for coupling the signal generating means to an indicator means for the transmission of signals thereto.

22. The head unit of claim 21 wherein the light source and light projecting means are mounted upon a rotatable turret and the rotation means acts to selectively rotate the turret relative to the base member.

23. The head unit of claim 21 wherein the light projecting means includes a reticle of pre-selected configuration to produce a projected image.

24. The head unit of claim 21 wherein the light source includes a plural filament lamp wherein at least one of the filaments is selectively operable relative to the others.

25. A head unit for measuring vehicle wheel toe comprising: a base member; means for removably mounting the base member upon a vehicle wheel; means for orienting the base member along a predetermined axis relatve to the wheel upon which it is mounted; means for maintaining the orientation of the base member on a predetermined axis; a light source carried by the base member; means connected to the light source for selective energization thereof and for coupling to a power source; light projecting means carried by the base member and disposed relative to the light source for transmission of a light beam on a predetermined optical axis; means for rotating the light projecting means relative to the base on an axis substantially normal to the optical axis; and wherein signal generating means connectable to a power source are carried by the base and means are provided for coupling the signal generating means to a computation means.

26. The head unit of claim 25 wherein the computation means is coupled to a meter means.

27. A method for producing predetermined toe angles of vehicle wheels comprising: determining the position of the rear wheels; measuring the position of each rear wheel of a vehicle; combining the positions of both rear wheels to determine the total toe of the rear wheels; computing the thrust-line of the vehicle determined by the position and combined toe angles of the rear vehicle wheels; measuring the toe angle of each front wheel of a vehicle in relation to the computed thrust-line of the vehicle; and adjusting the measured toe angle of each front wheel to a predetermined angular relationship with the computed thrust-line of the vehicle whereby the front wheel toe is set at a predetermined angle to the computed thrust-line of the vehicle.

28. The method of claim 27, including centering the steering wheel of the vehicle and maintaining the centered position thereof.

29. A method for setting front vehicle wheel toe angles and maintaining a centered steering wheel comprising the steps of: centering the steering wheel; measuring a first toe angle of the left and right front vehicle wheels; measuring a second tow angle of the left and right rear vehicle wheels; determining the position of the rear wheels; calculating a center of thrust-line reference of the rear vehicle wheels from the position of the second toe angle of the left and right rear vehicle wheels referenced to the respective first toe angle of the left and right front vehicle wheels; calculating a third toe angle of the left and right vehicle wheels from the second toe angle and position of the left and right rear vehicle wheels in relationship to the center of thrust-line reference; and setting the third toe angle into the left and right front vehicle wheels in relationship to the thrust-line reference.

30. The method of claim 29, wherein the step of calculating a center of thrust-line reference includes the steps of summing algebraically the second toe angle of the left and right rear vehicle wheels referenced to the respective first toe angle of the left and right front vehicle wheels.

31. The method of claim 29, wherein the step of calculating a third toe angle of the left and right front vehicle wheels includes the steps of subtracting algebraically the second toe angle and position of the left rear vehicle wheel from the thrust-line reference to define a first resultant to provide the third toe angles of the left front vehicle wheel and subtracting algebraically the second toe angle and position of the right rear vehicle wheel from the thrust-line reference to define a second resultant to provide the third toe angle of the right front vehicle wheel.

32. A method for centering the steering wheel and setting front toe angles of vehicle wheels comprising the steps of: centering the steering wheel of the vehicle; measuring a toe angle of the left and right front vehicle wheels with respect to a reference fixed at a predetermined distance from the opposite front vehicle wheel; measuring a toe angle and position of the left and right rear vehicle wheels with respect to the reference on the respective left and right front vehicle wheels; calculating a center of thrust-line reference of the rear vehicle wheels from the toe angle and position of the left and right rear vehicle wheels; referenced to the toe angle of the respective left and right front vehicle wheels; subtracting algebraically the toe angle of the left and right rear vehicle wheels from the thrust-line reference to determine a toe angle of the left and right front vehicle wheels in relationship to the thrust-line reference; and setting the toe angle of the left and right front vehicle wheels to a desired toe angle in relationship to the thrust-line reference and maintaining the steering wheel in centered position.

33. A method for setting front toe angles of vehicle wheels comprising the steps of: projecting selectively a first beam across the front of the vehicle to measure toe angle of the front wheel and a second beam to the axially adjacent rear wheel to measure toe angle and position of the rear wheel; mounting a first receiving reference target on the front wheel opposite the first beam and a second receiving reference target on the rear wheel opposite the second beam; and setting the amount of toe in a front vehicle wheel in relationship to a center of thrust-line reference obtained from the rear wheel position of the vehicle.

34. A method for measuring angular relationships of the wheels of a vehicle comprising the steps of: providing a head unit; positioning the head unit in a predetermined relationship with a first vehicle wheel; selectively projecting beams relative to the head unit and to beam receiving means disposed relative to second and third vehicle wheels; positioning the beam receiving means in a pre-selected relationship with respect to said second and third vehicle wheels; measuring the positional orientation of the rear-most pair of vehicle wheels relative to a reference axis; calculating a vehicle thrust-line reference from the positional orientation of the rear-most pair of the vehicle wheels established by beams projected to beam receiving means associated with such rear-most wheel pair; and measuring the angular relationship between the forward-most pair of vehicle wheels and the calculated thrust-line reference.

35. A method for measuring angular relationships of vehicle wheels comprising the steps of: providing a head unit; positioning the head unit in a pre-determined relationship with a first vehicle wheel; selectively projecting a beam relative to the head unit and to beam receiving means; positioning the beam receiving means in pre-selected relationships with respect to other vehicle wheels; measuring the angular relationship between the projected beam and a reference axis on the other vehicle wheels; and further including the steps of positioning the head unit adjacent one of the front wheels of the vehicle, providing a second head unit, positioning the second head unit in a pre-determined relationship with another of the front wheels of the vehicle, selectively projecting a beam relative to the second head unit to a beam receiving member, and positioning the beam receiving member adjacent each of two rear vehicle wheels for receipt of the projected beam.

36. A method for measuring toe of wheels on a vehicle comprising the steps of: mounting a head unit on a front wheel; mounting beam receiving members on the front wheel opposite the head unit and the rear wheel axially adjacent the head unit; selectively projecting a first beam across the front of the vehicle to measure front wheel toe and a second beam to the axially adjacent rear wheel to determine rear wheel position and toe; mounting a head unit on another front wheel; mounting beam receiving members on the front wheel opposite such other front wheel and the rear wheel axially adjacent the other front wheel; selectively projecting a third beam across the front of the vehicle to measure front wheel toe and a fourth beam to the axially adjacent rear wheel to determine rear wheel position and toe; calculating a vehicle thrust-line reference from the toe and positions of the rear wheels; and measuring front wheel toe in relation to the vehicle thrust-line reference.

37. A system for centering the steering wheel and measuring toe of wheels on a vehicle comprising: means for maintaining the steering wheel in a fixed center position; a first head unit; a first wheel clamp mounting the first head unit on the left front wheel; a second head unit; a second wheel clamp mounting the second head unit on the right front wheel; a first turret assembly connectable to a power supply and carried by the first head unit to selectively project a first light beam across the front of a vehicle to measure left front wheel position and to selectively project a second light beam to the axially adjacent left rear wheel to determine left rear wheel toe; a second turret assembly connectable to a power supply and carried by the second head unit to selectively project a third light beam across the front of the vehicle to measure right front wheel position and to selectively project a fourth light beam to the axially adjacent right rear wheel to determine right rear wheel position; each of the first and second turret assemblies comprising a lamp, a toe condenser and lens assembly, and a tracking condenser and lens assembly which are positioned on parallel optical axes; each of the turret assemblies further including a turret rotatable about a shaft relative to the base of the turret assembly and a signal generator coupled to the turret assembly to produce a signal value proportional to the rotation of the turret; targets mounted on the head units of the left and right front wheels; mirrors mounted on each of the left and right rear wheels; means connecting the signal generators to a computation means; and meter means coupled to the computation means for indicating the amount of toe in the left and right front wheels in relation to a vehicle thrust-line reference calculated from the rear wheel positions on the vehicle whereby each of the first and second turrets on the first and second head units can be operated to selectively project beams directly to the targets of the head units and indirectly thereto through mirrors thereby causing signal values produced by the signal generator to be transmitted to the computation means and calculated values therefrom visually displayed on the meter means.

38. A system of claim 37 wherein the signal generator comprises a potentiometer having an output voltage value proportional to the rotation of the turret.

* * * * *